(12) United States Patent
Trumbo et al.

(10) Patent No.: US 10,173,707 B2
(45) Date of Patent: Jan. 8, 2019

(54) SHOPPING CART COVER

(71) Applicant: Munchkin, Inc., Van Nuys, CA (US)

(72) Inventors: Nicholas Arthur Trumbo, La Canada, CA (US); Sung Yun Chan, Pasadena, CA (US); Mark Gerard Tebbe, Ventura, CA (US); Tal Zaksenberg, Scotch Plains, NJ (US)

(73) Assignee: MUNCHKIN, INC., Van Nuys, CA (US)

( * ) Notice: Subject to any disclaimer, the term of this patent is extended or adjusted under 35 U.S.C. 154(b) by 0 days.

(21) Appl. No.: 15/423,546

(22) Filed: Feb. 2, 2017

(65) Prior Publication Data

US 2017/0217468 A1 Aug. 3, 2017

Related U.S. Application Data

(60) Provisional application No. 62/290,386, filed on Feb. 2, 2016.

(51) Int. Cl.
*A47C 31/02* (2006.01)
*A47C 31/11* (2006.01)
*A47D 1/10* (2006.01)
*B62B 3/14* (2006.01)
*A47D 15/00* (2006.01)

(52) U.S. Cl.
CPC .............. *B62B 3/1448* (2013.01); *A47D 1/10* (2013.01); *A47D 15/006* (2013.01); *B62B 3/1436* (2013.01)

(58) Field of Classification Search
CPC ...... A47D 1/10; A47D 15/006; B62B 3/1436; B62B 3/1448

USPC .................................. 297/256.17, 219.12
See application file for complete search history.

(56) References Cited

U.S. PATENT DOCUMENTS

| | | | | |
|---|---|---|---|---|
| 4,655,502 A * | 4/1987 | Houllis | ................ | A47D 15/006 280/33.993 |
| 5,238,293 A * | 8/1993 | Gibson | ................... | B62B 3/144 280/33.993 |
| 5,547,250 A * | 8/1996 | Childers | ................. | B62B 3/144 297/256.17 X |
| 5,678,888 A * | 10/1997 | Sowell | .................... | B62B 3/144 297/256.17 X |
| 5,855,412 A * | 1/1999 | Smith | ..................... | B62B 3/144 297/256.17 X |
| 5,897,165 A * | 4/1999 | Kucharczyk | ........... | B62B 3/144 297/256.17 X |
| 5,967,606 A * | 10/1999 | Bergh | ..................... | B62B 3/144 297/256.17 X |
| 5,967,607 A * | 10/1999 | Waldroup | ............... | B62B 3/144 297/256.17 X |
| 6,036,264 A * | 3/2000 | Lucree | .................... | B62B 3/144 297/256.17 X |
| 6,129,417 A * | 10/2000 | Cohen-Fyffe | ........... | B62B 3/144 297/256.17 X |
| 6,129,418 A * | 10/2000 | Bergh | ..................... | B62B 3/144 297/256.17 X |

(Continued)

*Primary Examiner* — Rodney B White
(74) *Attorney, Agent, or Firm* — Robert Z. Evora, Esq.; Christian M. Lek (57) ABSTRACT

A versatile cover is described which can be secured onto a shopping cart, high chair, stroller or other similar seating apparatus. The cover is rollable into a low profile, shape with a handle, and can be unrolled to fit within a seat basket of a shopping cart or high chair.

19 Claims, 12 Drawing Sheets

(56) References Cited

U.S. PATENT DOCUMENTS

| | | | | |
|---|---|---|---|---|
| 6,237,998 B1* | 5/2001 | Aprile | B62B 3/144 | |
| | | | 297/256.17 X | |
| 6,491,996 B2* | 12/2002 | Digangi | B32B 27/06 | |
| | | | 297/256.17 X | |
| 6,669,289 B1* | 12/2003 | Hays | B62B 3/144 | |
| | | | 297/256.17 | |
| 6,848,743 B1* | 2/2005 | Collins | B62B 3/1456 | |
| | | | 297/256.17 X | |
| 6,929,326 B2* | 8/2005 | Cohen-Fyffe | A47C 31/11 | |
| | | | 297/256.17 X | |
| 7,367,621 B1* | 5/2008 | Han-Dressor | B62B 3/144 | |
| | | | 297/256.17 X | |
| 7,878,587 B1* | 2/2011 | Leach | A47D 15/006 | |
| | | | 297/256.17 X | |
| 8,042,869 B2* | 10/2011 | McClintock | B62B 3/144 | |
| | | | 297/256.17 X | |
| 8,113,580 B1* | 2/2012 | Pusateri | A47C 31/11 | |
| | | | 297/256.17 X | |
| 8,382,201 B2* | 2/2013 | Mills | A47D 15/006 | |
| | | | 297/256.17 X | |
| 8,696,400 B2* | 4/2014 | Fair | A63H 33/006 | |
| | | | 297/256.17 X | |
| 8,770,663 B2* | 7/2014 | Zack | A47C 31/11 | |
| | | | 297/256.17 X | |
| 8,857,905 B1* | 10/2014 | Pusateri | B62B 3/1448 | |
| | | | 297/256.17 X | |
| 9,622,591 B2* | 4/2017 | Lipson | A47C 31/11 | |
| 2003/0205922 A1* | 11/2003 | Norman | A47D 1/10 | |
| | | | 297/256.17 | |
| 2003/0227202 A1* | 12/2003 | Endicott | A47D 15/006 | |
| | | | 297/256.17 | |
| 2004/0066070 A1* | 4/2004 | Sampson | B62B 3/144 | |
| | | | 297/256.17 | |
| 2006/0103201 A1* | 5/2006 | Lundgren | B62B 3/144 | |
| | | | 297/256.17 | |
| 2006/0119153 A1* | 6/2006 | Feist | B62B 3/144 | |
| | | | 297/256.17 | |
| 2008/0030056 A1* | 2/2008 | Bentley | B62B 3/144 | |
| | | | 297/256.17 | |
| 2008/0084099 A1* | 4/2008 | Palgon | A47C 31/11 | |
| | | | 297/219.12 | |
| 2008/0211280 A1* | 9/2008 | Reynolds | B62B 3/144 | |
| | | | 297/256.17 | |
| 2008/0258528 A1* | 10/2008 | Bush | B62B 3/144 | |
| | | | 297/256.17 | |
| 2009/0236379 A1* | 9/2009 | Johnston | A45C 7/0077 | |
| | | | 224/155 | |
| 2010/0065172 A1* | 3/2010 | Dus | A47D 15/006 | |
| | | | 150/158 | |
| 2013/0264852 A1* | 10/2013 | Zack | A47C 31/11 | |
| | | | 297/219.12 | |

* cited by examiner

SHOPPING CART COVER

CROSS REFERENCE TO RELATED APPLICATIONS

This application claims priority to U.S. Provisional Patent Application Ser. No. 62/290,386, filed Feb. 2, 2016; the content of which is hereby incorporated by reference herein in its entirety into this disclosure.

TECHNICAL FIELD

The subject disclosure relates generally to the field of protective covers. In particular, the subject disclosure relates to a shopping cart or high chair cover.

BACKGROUND

Infants and toddlers often explore their new world by touching and tasting virtually everything they come into contact with. Although parents and caretakers often take precautions at home to ensure that the surfaces of various objects are clean and safe for contact, the same precautions cannot be taken when traveling outside of the home.

The environment outside of the home provides numerous opportunities for infants and toddlers to hurt themselves, or to make themselves sick by contact with unclear surfaces. For example, a frequent place where parents and caretakers must bring their young children is the supermarket. Most supermarkets provide standard shopping carts which allow the consumer to collect and transport numerous objects with minimal physical burden. However, the supermarket is also a dangerous environment for young children as they explore thousands of new items presented in attractive and colorful packaging, many of which are very harmful for the child. Thus, while parents and caretakers must continue to conduct the necessary chore of shopping, the exposure of their children to the shopping environment presents a tense experience for the parent or caretaker.

SUMMARY OF THE SUBJECT DISCLOSURE

The present subject disclosure provides a concept for novel devices which may be used as covers for standard shopping carts, high chairs, strollers, car seats, or other seating often used for young children. The present subject matter provides an easy to transport, use, and store package which may be carried by the parent or caretaker along with the young child, and used when needed to prevent the child from being exposed to dangerous items which can physically harm the child, or can make the child sick from exposure to various contaminated environments. The present subject matter also provides an easy to clean surface which serves to contain any mess that the young child has made and prevent further work by the parent or caretaker.

In one exemplary embodiment, the present subject matter is a seat cover. The seat cover includes a hood adapted to fit onto a backrest of a seat; a front portion adapted to extend over an edge; side portions connecting the hood portion to the front portion, and adapted to extend over side edges; and a securing device attached to the hood, the securing device adapted to attach the hood to the seat; wherein the cover is completely rollable and is maintained in its rolled position by the securing device.

In another exemplary embodiment, the present subject matter is a low profile, rollable seat cover for a shopping cart. The seat cover includes a reversible hood where in a first position is adapted to fit onto a backrest of a seat; a front portion attached to the reversible hood and adapted to extend over a handle; wherein the cover is completely rollable and is maintained in its rolled position by the reversible hood in a second position.

In yet another exemplary embodiment, the present subject matter is a method of placing a cover over a seat. The container assembly includes providing a cover having a hood, a front portion, and side portions; placing the hood over a backrest of the seat; securing the hood to the backrest of the seat; unfolding the cover completely; extending the front portion over a front portion of the seat; and expanding the side portions over side portions of the seat.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Particular embodiments of the present subject disclosure will now be described in greater detail with reference to the figures.

An exemplary embodiment of the present subject disclosure is presented as a seat cover 100, as shown in FIGS. 1A-1D. The seat cover 100 includes a back portion or hood 101, a front portion 102, with two side portions 103 extending along both lateral portions of the device 100. The hood 101, back portion 102, and side portions 103 all have a hood-like or parachute-like configuration with an interior chamber like space which allows them to rest upon and surround an underlying object, as will be described in more detail below.

The front portion 102 further includes a pocket 105, which may be used to store a mobile phone, keys, wallet, identification or other such sized items which may need to be stored. The pocket 105 may have a transparent window to easily identify the contents, or view an electronic device. Alternatively, the pocket 105 may be opaque to protect the security of the objects stored therein.

One or more loops 106 may be used to secure additional items to the front portion 102, which can include, but are not limited to, toys, pacifiers, bottles, keys, or other object which can be secured to the fastener loop 106. Other types of fasteners may also be used in place of the loop 106, as the loop is only presented for sake of simplicity. Other similar function devices may be used as well and are within the purview of one having ordinary skill in the art.

A strap 110 having multiple apertures 111 is attached to an underside of the cover 100 and is adapted to mate with a corresponding hook 112 which is positioned on the underside of hood portion 101. Both strap 110 and hook 111 are in close proximity together to be able to interact and connect both when the cover is completely stretched open atop a shopping cart, and when the cover is completely rolled up. A small hook housing 113 stores the hook 112 and prevents accidental attachment of the hook 112 to unintended devices. Other types of connection devices may also be substituted for the strap 110 and hook 112 and are within the scope of the present subject disclosure. A safety belt 115 with fastener/lock 116 is positioned on the upper side of the cover 101, in the seat portion in between the back portion 101 and the front hood portion 102.

Figure 1A:
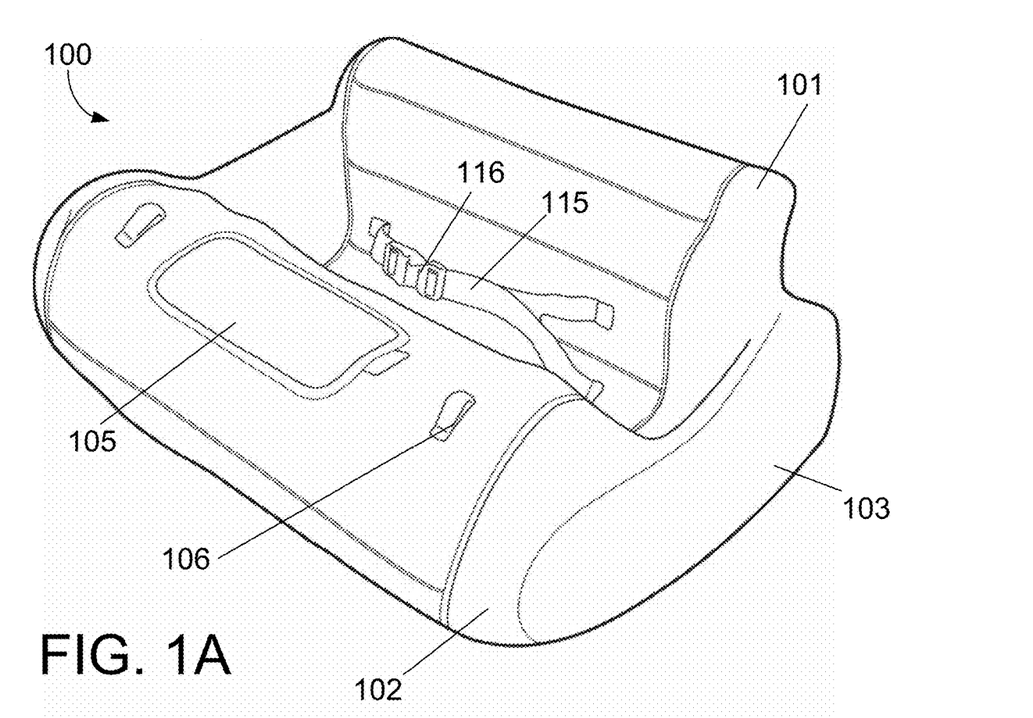
FIG. 1A illustrates a top perspective view of a seat cover, according to an exemplary embodiment of the present subject disclosure.
Figure 1B:
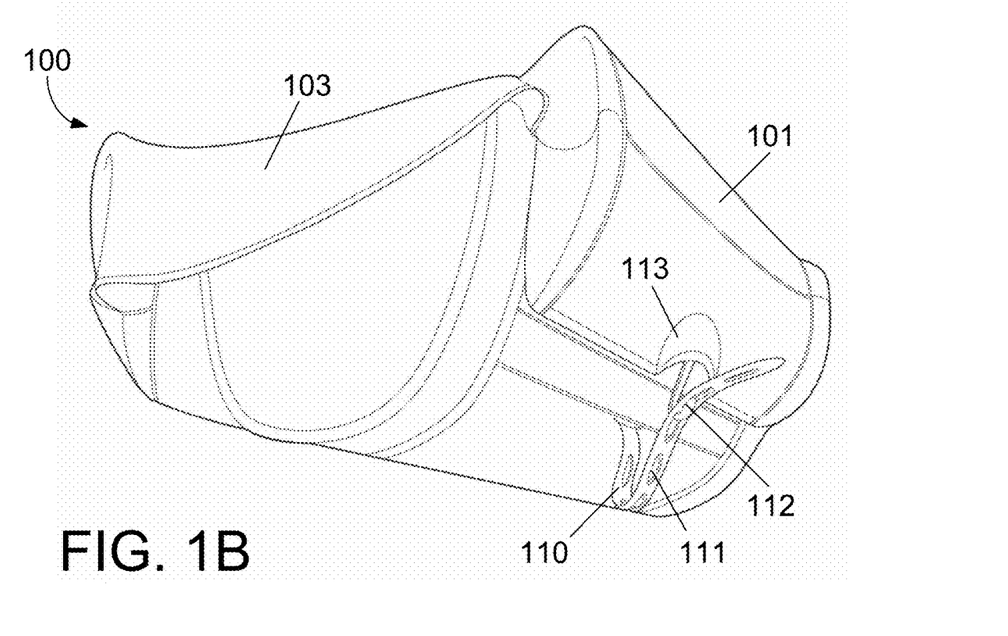
FIG. 1B illustrates a bottom perspective view of a seat cover, according to an exemplary embodiment of the present subject disclosure.
Figure 1C:
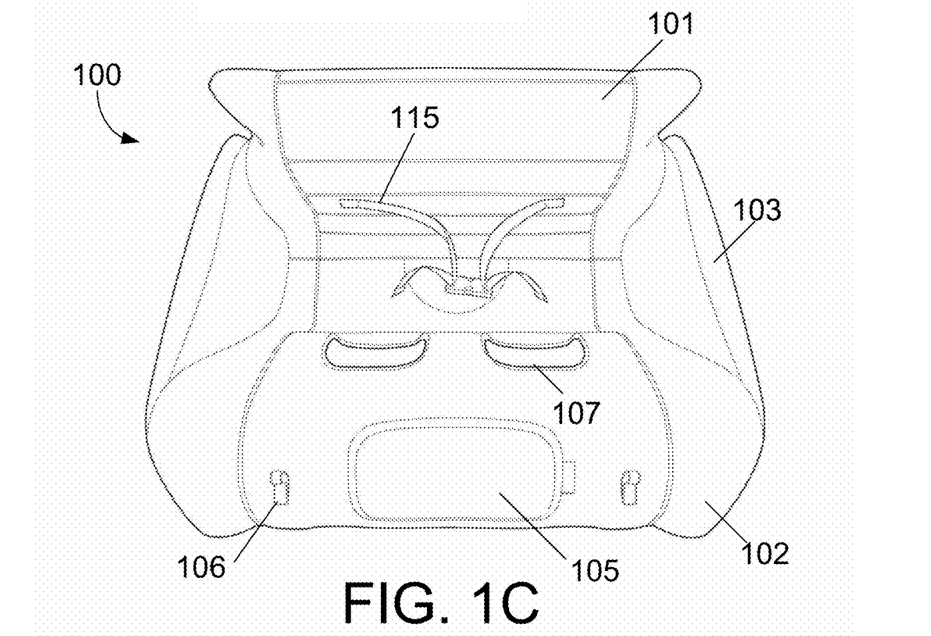
FIG. 1C illustrates a top view of a seat cover, according to an exemplary embodiment of the present subject disclosure.

As shown in FIG. 1C, one or more leg holes 107 are positioned toward the front portion 102 of the cover 100. In the exemplary embodiment shown, two leg holes 107 are presented, but only one large one may also be used to accommodate both legs. Using two leg holes 107 provides added security in preventing a toddler from wanting to stand up or move beyond what is safe. Each leg hole 107 may be covered with a cloth cover which is detachable at least partially to allow the cloth cover to dangle just underneath the leg or thigh of the toddler when seated on the cover 100 to keep the toddler comfortable while also protecting the legs from contact with the cart 200.

Figure 1D:
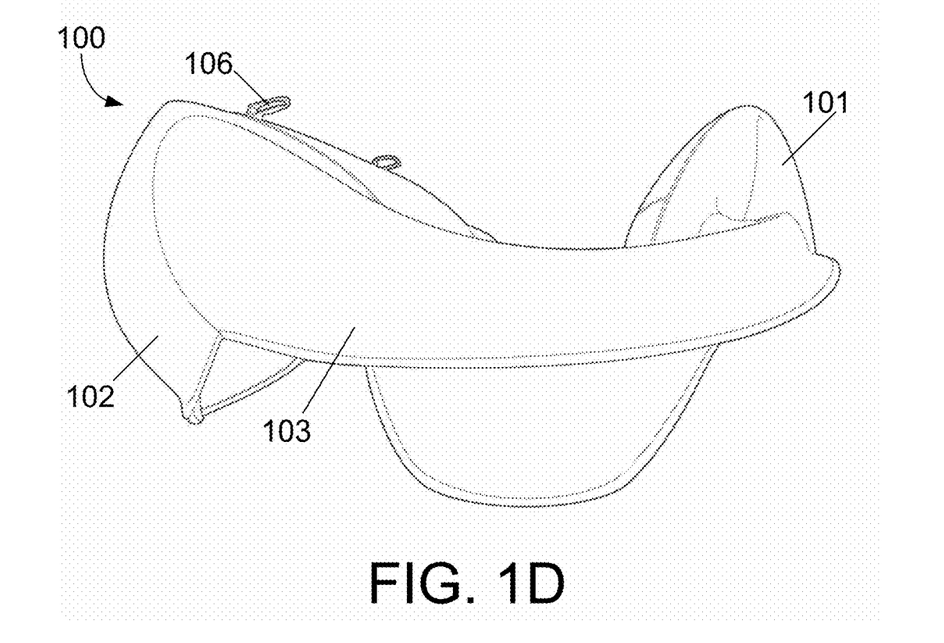
FIG. 1D illustrates a side view of a seat cover, according to an exemplary embodiment of the present subject disclosure.

As shown in FIG. 1D, the back hood 101, the front portion 102, and the side portions 103 are all shaped to rest upon and surround an underlying object, which may be a shopping cart, child's high chair, stroller, car seat, or any other apparatus which can reliably accommodate the cover 100.

Figure 2:
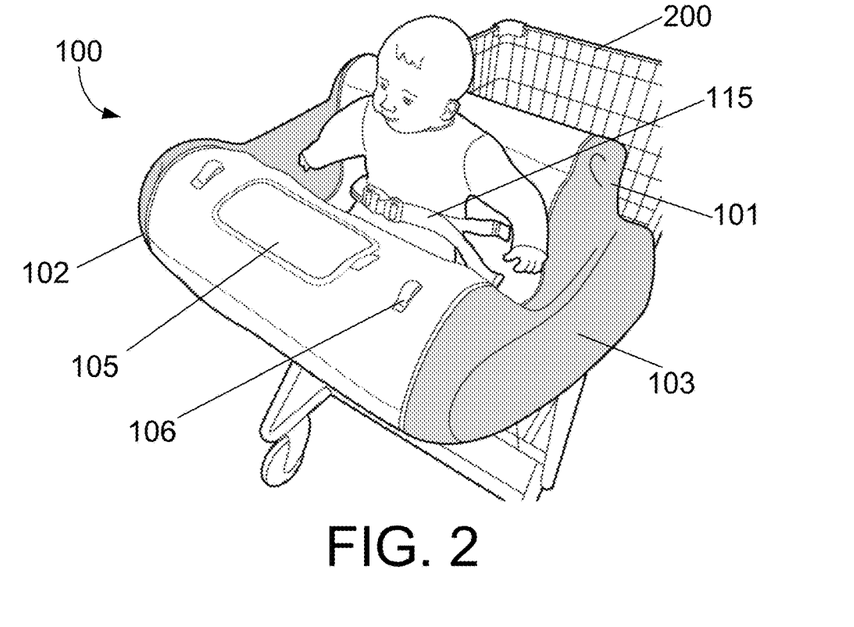
FIG. 2 illustrates a perspective view of a seat cover in use while on a shopping cart, according to an exemplary embodiment of the present subject disclosure.

FIG. 2 illustrates an exemplary shopping cart cover 100 in use as placed on a standard shopping cart 200. The proper placement of the cover 100 on a shopping cart 200 allows a toddler to be securely fastened to the cover 100 using seat belt 115 and prevent the toddler from coming into contact with any germ or dangerous edges or moving parts on the shopping cart 200. All that the toddler is exposed to, or can reach, is the upper side of the cover 100. Further, an electronic device (not shown) may be placed inside the pocket 105 which may be set up to show a movie, a game or other sound or visual display which can be used to entertain the toddler, and prevent the toddler from wanting to stand up or get out of the shopping cart 200. This will allow the parent or caretaker to shop as needed while minimizing the stress of having to entertain the toddler during the shopping trip.

Figure 3:
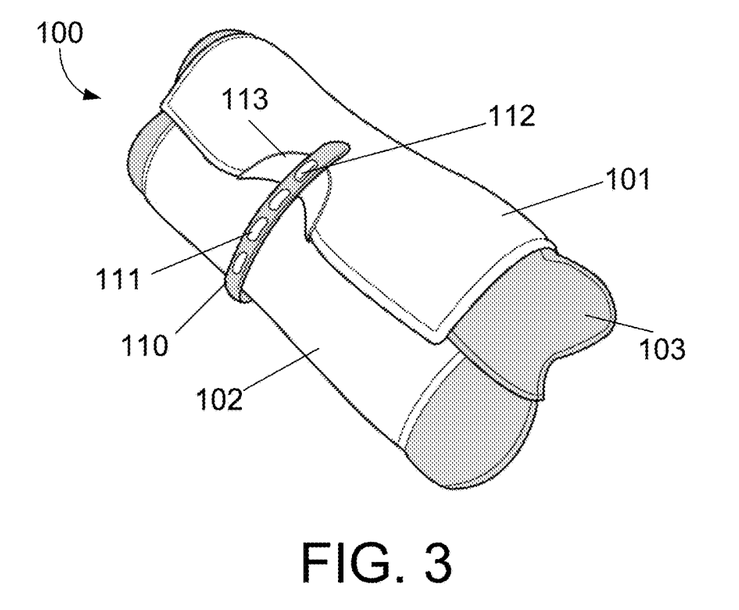
FIG. 3 illustrates a perspective view of a seat cover, according to an exemplary embodiment of the present subject disclosure.

FIG. 3 illustrates the low profile nature and transportability of the cover 100. As shown, the cover 100 may be rolled onto itself in a pillow like manner and secured with the same strap 110 and hook 112 used to secure the device 100 to a shopping cart 200. The hood 103 serves to accommodate the rolled up body of the cover 100. The compacted cover 100 may be packed into a purse to use as needed, or put into a luggage to use while traveling. The strap 110 is also useable as a handle to carry the cover 100 by hand as needed until needed for use.

Figure 4:
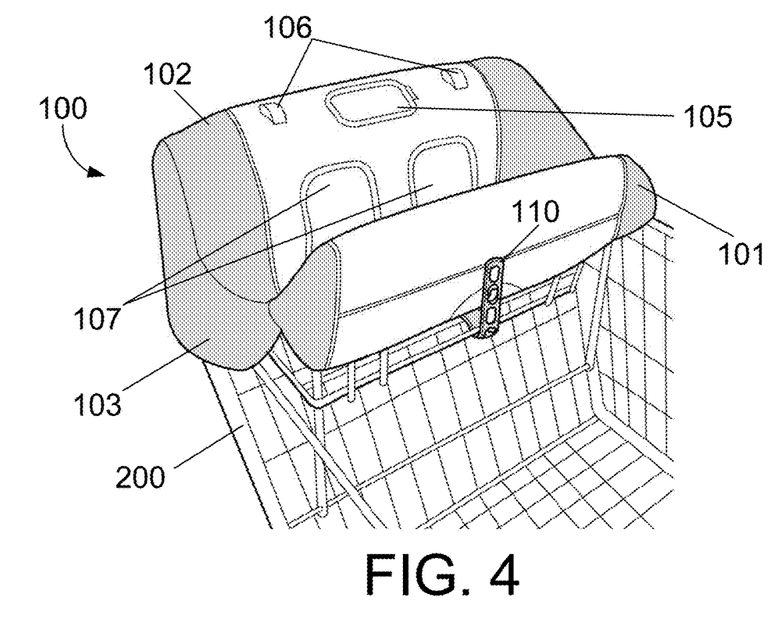
FIG. 4 illustrates a perspective view of a seat cover on a shopping cart, according to an exemplary embodiment of the present subject disclosure.
Figure 5:
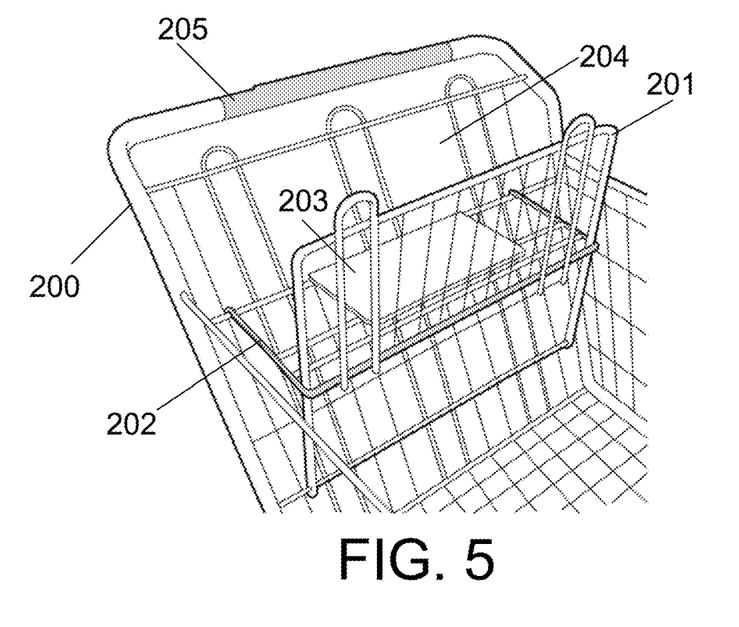
FIG. 5 illustrates a perspective view of a shopping cart.

FIGS. 4-5 Illustrates the positioning of the cover 100 on a standard shopping cart 200. A standard shopping cart 200 includes an adjustable seat/basket portion with a vertical portion or backrest 201 interacting with an external base frame 202 which moves from a substantially vertical portion when not in use, to a substantially horizontal position when in use. A seating platform 203 may be independently moved from a substantially vertical position (to store items in the basket portion without them falling out of the openings 204), and a substantially horizontal position (to allow a toddler's legs to slide through and dangle from the openings 204 in the basket when the toddler is placed in the adjustable basket). Further, a handle 205 is positioned directly in front of the toddler when placed inside the adjustable basket.

As illustrated in FIGS. 4-5, the hood portion 101 of the cover 100 is placed atop the upper portion of the vertical backrest portion 201, the front portion 102 is placed atop the shopping cart handle 205, and the side portions 103 are stretched out and cover the side portions of the adjustable basket.

FIGS. 6-12 illustrate an exemplary method of the use of the cover 100 on a standard shopping cart 200. When a parent or caretaker brings a toddler into a store and obtains a shopping cart, the cover 100 is brought out to use. Initially, the cover will likely be in the transport configuration as shown in FIG. 3. It must be properly secured on to the shopping cart 200.

Figure 6:
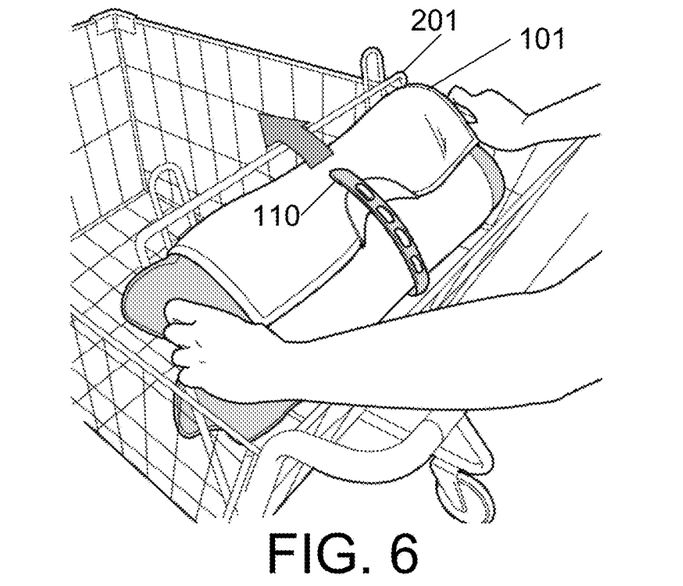
FIG. 6 illustrates a perspective view of a step in the placement of a seat cover on a shopping cart, according to an exemplary embodiment of the present subject disclosure.
Figure 7:
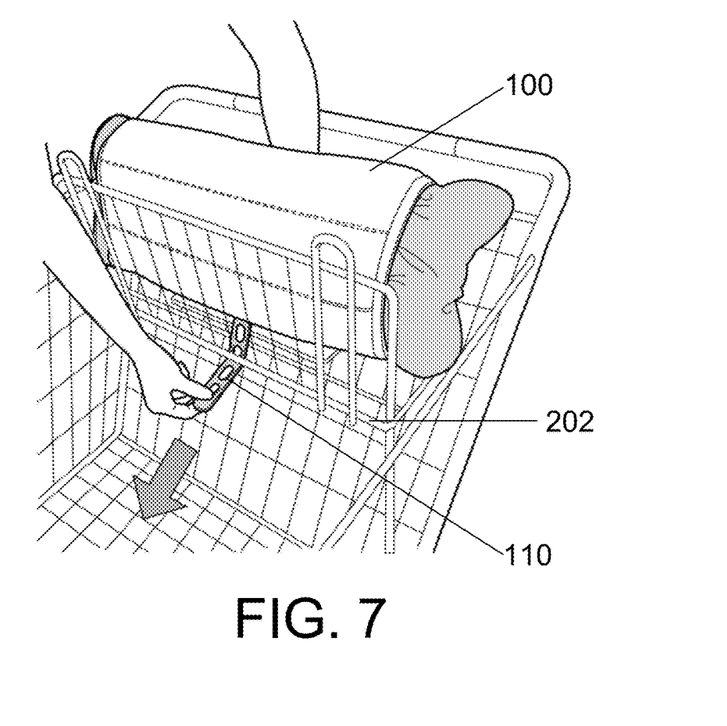
FIG. 7 illustrates a perspective view of a step in the placement of a seat cover on a shopping cart, according to an exemplary embodiment of the present subject disclosure.
Figure 8:
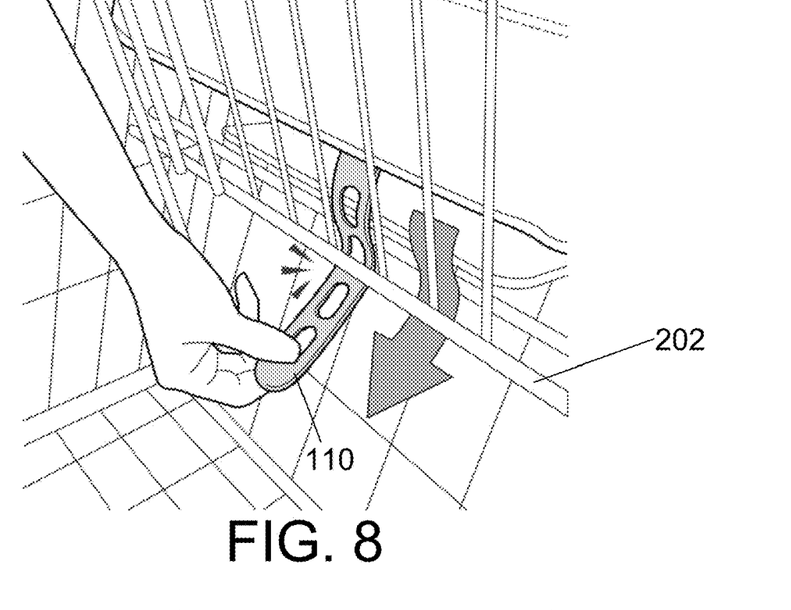
FIG. 8 illustrates a perspective view of a step in the placement of a seat cover on a shopping cart, according to an exemplary embodiment of the present subject disclosure.

FIG. 6 illustrates the placement of the folded cover 100 onto the shopping cart 200 seat/basket. Cover 100 is placed onto the seat/basket with the strap 110 pointing upwards. Next, as shown in FIG. 7, the strap 110 is unhooked and pulled down under the seat/basket behind the base frame 202. As shown more closely in FIG. 8, strap 110 must be hooked under the base frame 202 and pulled down tight to ensure a secure fit to the shopping cart 200. Since this is the main source of connecting the cover 100 to the shopping cart 200, proper installation is necessary to ensure the security of a toddler sitting atop the cover 100.

Figure 9:
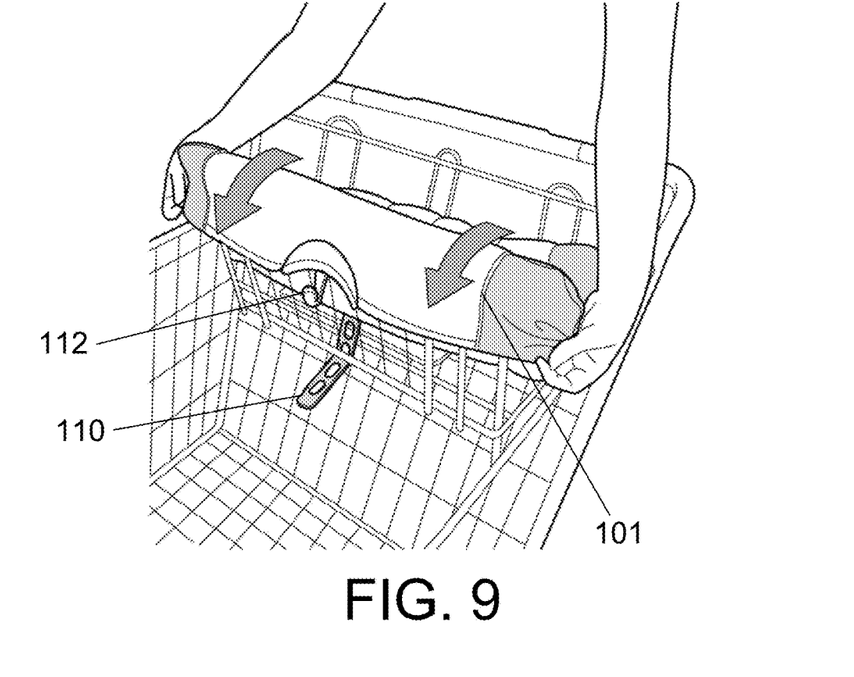
FIG. 9 illustrates a perspective view of a step in the placement of a seat cover on a shopping cart, according to an exemplary embodiment of the present subject disclosure.

As illustrated in FIG. 9, once the strap 110 is pulled down below the base frame 202, the hood 101 of the cover 100 is unrolled, and flipped back over the backrest 201. In this process, the hook 112 becomes exposed and comes in close proximity to the strap 110.

Figure 10:
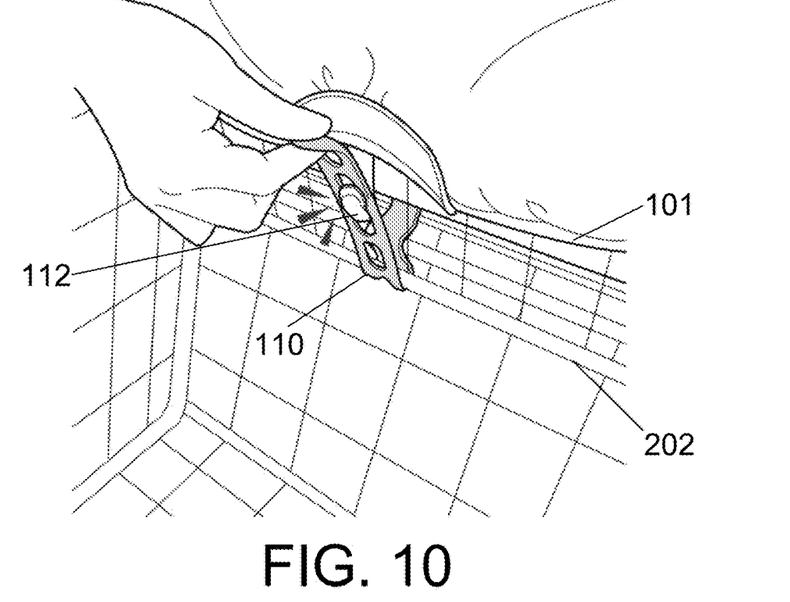
FIG. 10 illustrates a perspective view of a step in the placement of a seat cover on a shopping cart, according to an exemplary embodiment of the present subject disclosure.

FIG. 10 illustrates the strap 110 being pulled up and secured to the hook 112 at an appropriate aperture 111 available from a plurality of apertures. The fit around the bottom frame 202 should be snug. A further check should be made to ensure that cover 100 is securely attached to shopping cart 200 and not easily removable.

Figure 11:
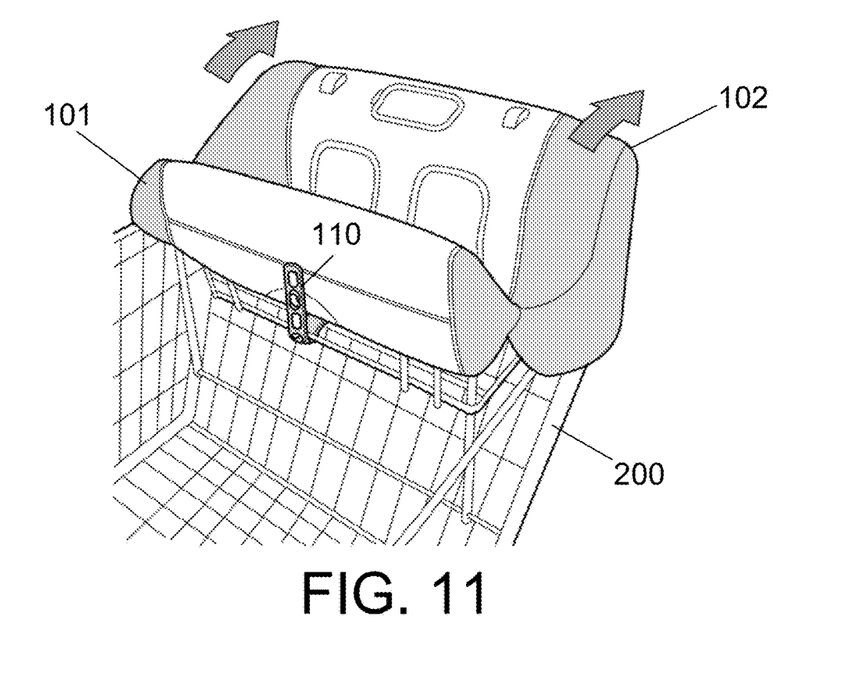
FIG. 11 illustrates a perspective view of a step in the placement of a seat cover on a shopping cart, according to an exemplary embodiment of the present subject disclosure.

FIG. 11 illustrates the unrolling of the cover 100 over the handle 205 of the cart 200. Front portion 102 is adapted to fit snugly over the handle 205 of the cart 200 and drape over it as needed. The hood portion 101, the front portion 102, and the side portions 103 all substantially cover most of the underlying components of the shopping cart 200. See FIG. 2 for front perspective view of the front portion 102 entirely covering the handle 205. The cart 200 may be pushed by gripping the front portion 102 directly over the handle 205. Alternatively, the handle 205 may be gripped from underneath the front portion 102.

Figure 12:
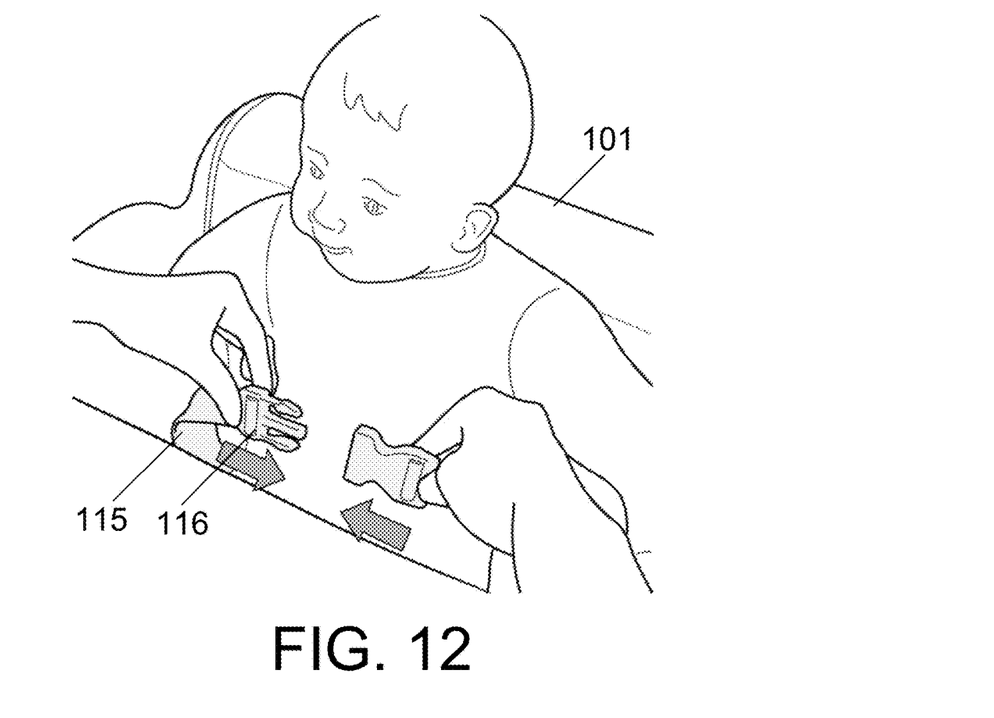
FIG. 12 illustrates a perspective view of a step in the placement of a seat cover on a shopping cart, according to an exemplary embodiment of the present subject disclosure.

Once the cover 100 is securely fastened onto the shopping cart 200, the toddler may be placed therein, as shown in FIG. 12. The toddler's legs will be pulled through the leg holes 107 and the toddler's bottom should be securely seated into the seat portion of the cover 100. The belt 115 is then drawn around the midsection of the toddler and secured using fastener lock 116. To tighten the seat belt 115, a seat belt adjusting lock (not shown) may be used to adjust the size of the seat belt. The parent or caretaker can now proceed with shopping as the toddler is securely fastener to the cover 100, which is also securely fastened to the shopping cart 200. Optional toys, keys, or other distraction devices may be secured onto the hooks 106 and/or an electronic device, such as a smart phone, may be secured into pocket 105 to provide entertainment for the toddler.

Figure 13:
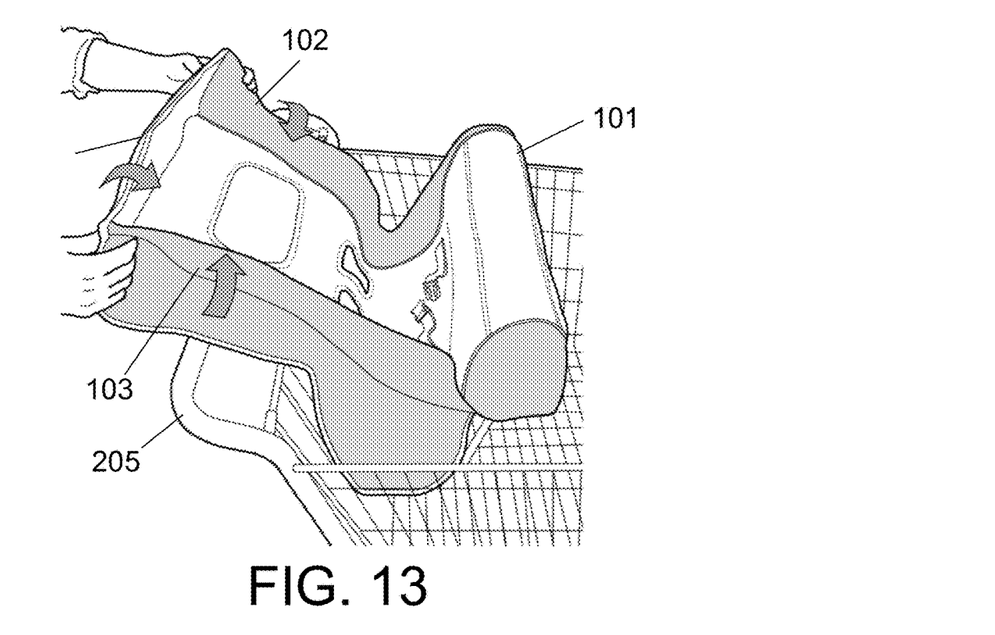
FIG. 13 illustrates a perspective view of a step in the removal of a seat cover from a shopping cart, according to an exemplary embodiment of the present subject disclosure.
Figure 14:
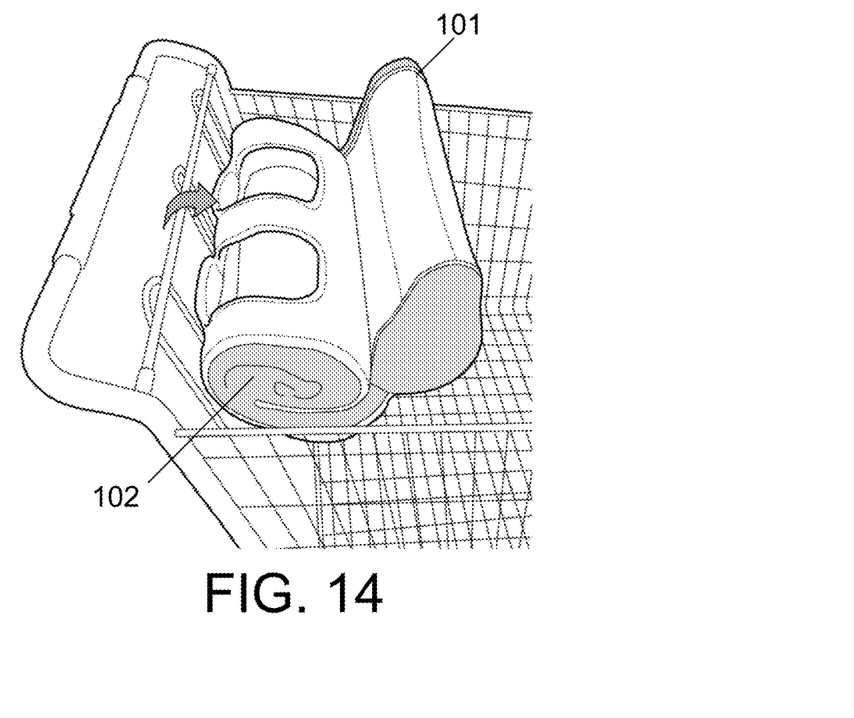
FIG. 14 illustrates a perspective view of a step in the removal of a seat cover from a shopping cart, according to an exemplary embodiment of the present subject disclosure.
Figure 15:
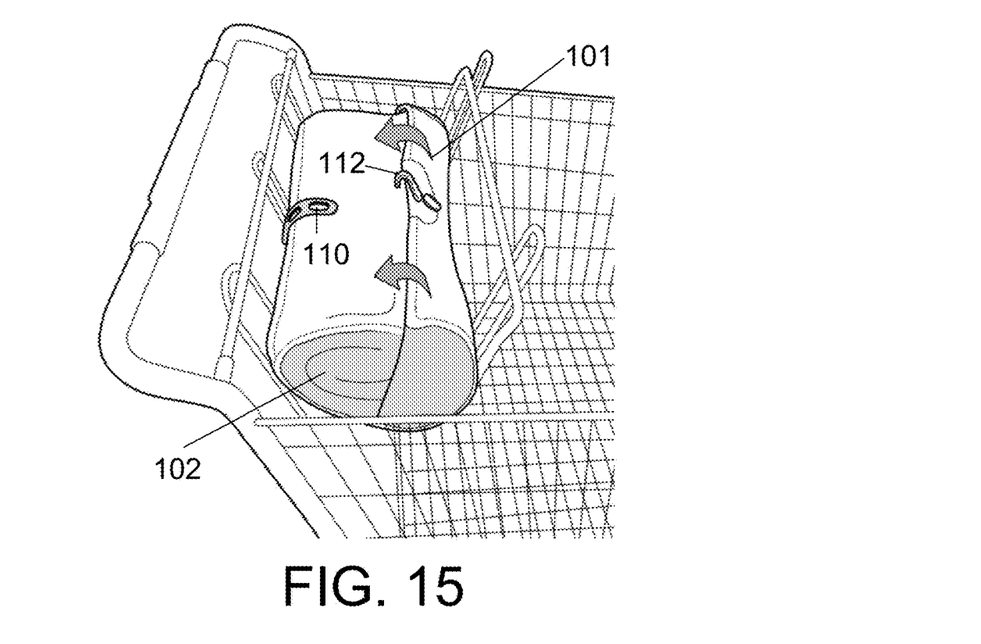
FIG. 15 illustrates a perspective view of a step in the removal of a seat cover from a shopping cart, according to an exemplary embodiment of the present subject disclosure.
Figure 16:
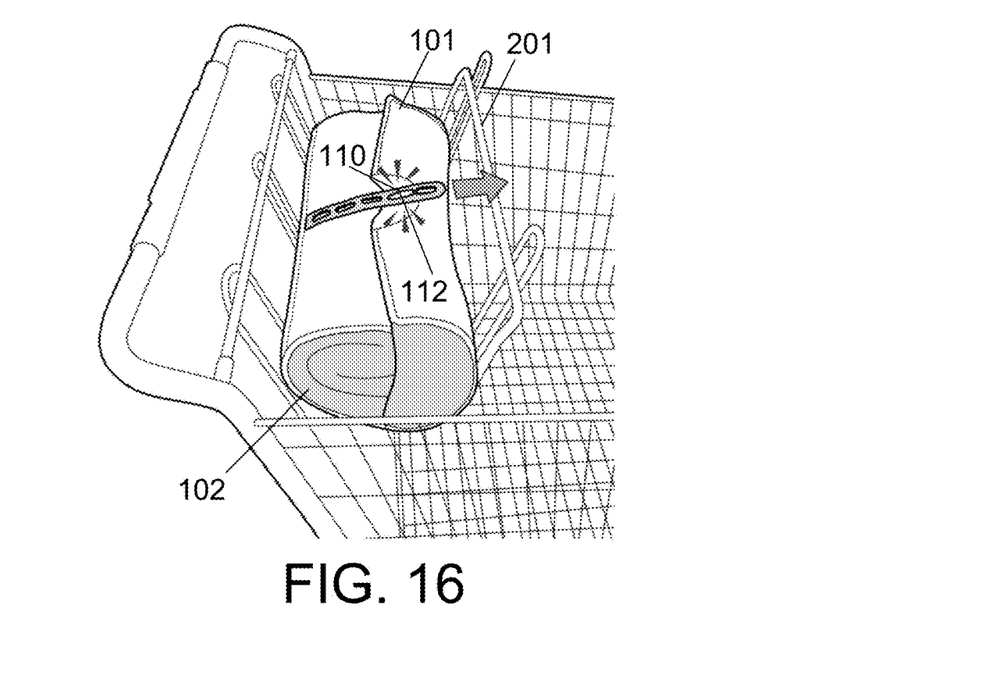
FIG. 16 illustrates a perspective view of a step in the removal of a seat cover from a shopping cart, according to an exemplary embodiment of the present subject disclosure.

FIGS. 13-16 illustrate the steps involved in the folding of the cover 100. These steps are essentially the reverse of the steps shown in FIGS. 6-12. As shown in FIG. 13, the front portion 102 of cover 100 is removed from the handle 205 of the cart 200, while the sides 103 are tucked inwards. FIG. 14 illustrates the step of the front 102 of cover 100 being rolled toward the hood 101, which is still resting on the backrest 201. At this point, if the strap 110 has not yet been unhooked from the hook 112, it must be unhooked to proceed to the next step. FIG. 15 illustrates removing the hood 101 from the backrest 201 and flipping it over completely and over the already rolled cover 102. The hood 101 is reversible and serves two different functions in each of its two positions. The final step, as shown in FIG. 16, is the securing of the strap 110 to the hook 112 of the hood 101 to create a convenient carrying handle. The cover 100 is now tightly wrapped, compactly packaged, and easy to transport.

Figure 17:
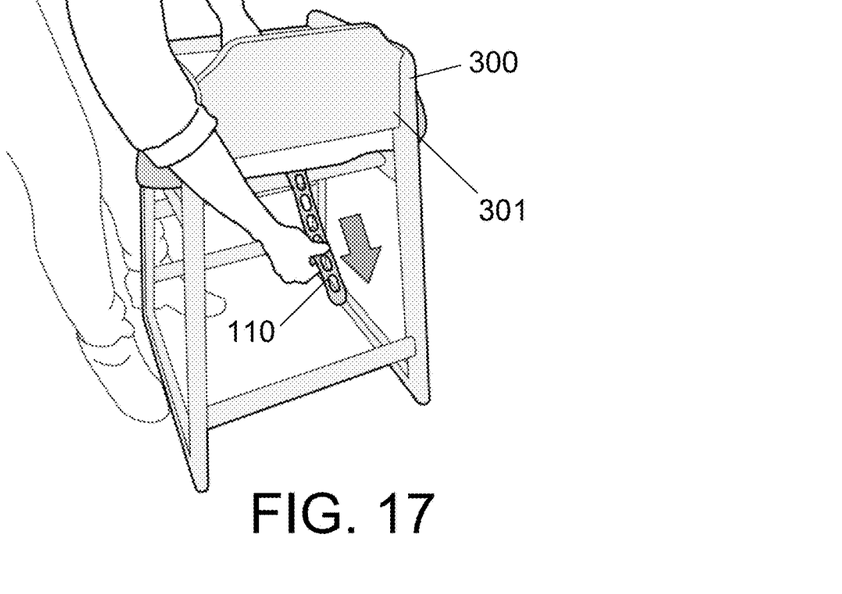
FIG. 17 illustrates a perspective view of a step in the placement of a seat cover on a high chair, according to an exemplary embodiment of the present subject disclosure.
Figure 18:
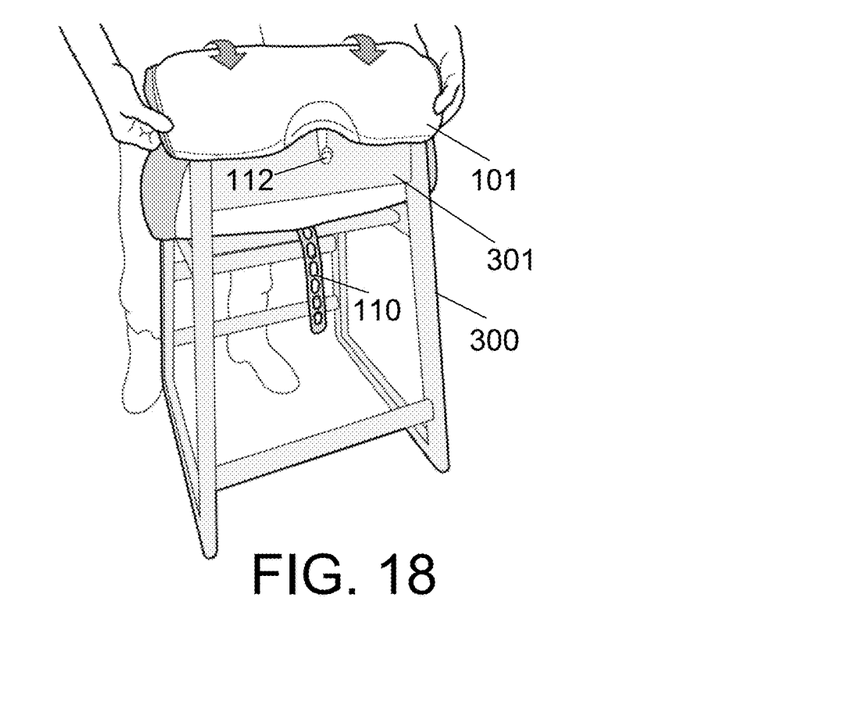
FIG. 18 illustrates a perspective view of a step in the placement of a seat cover on a high chair, according to an exemplary embodiment of the present subject disclosure.
Figure 19:
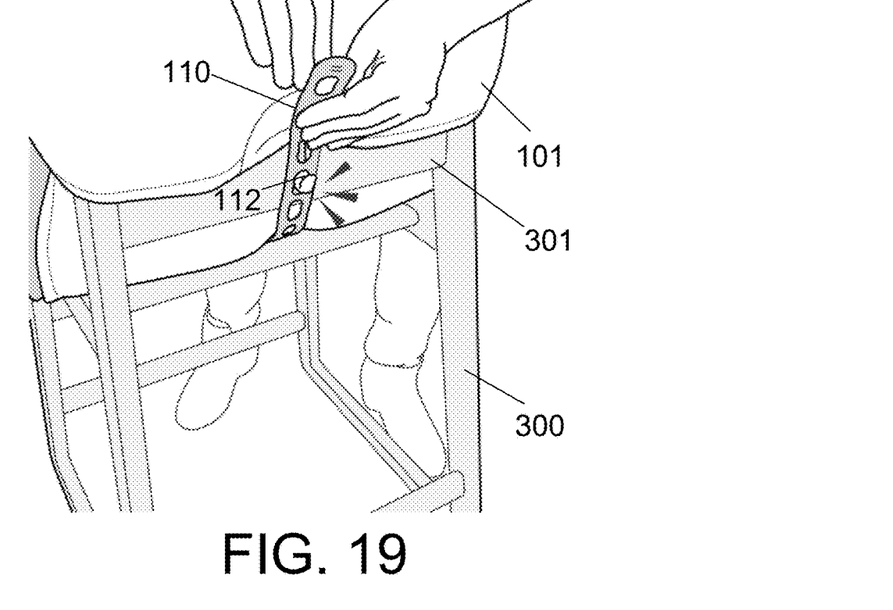
FIG. 19 illustrates a perspective view of a step in the placement of a seat cover on a high chair, according to an exemplary embodiment of the present subject disclosure.
Figure 20:
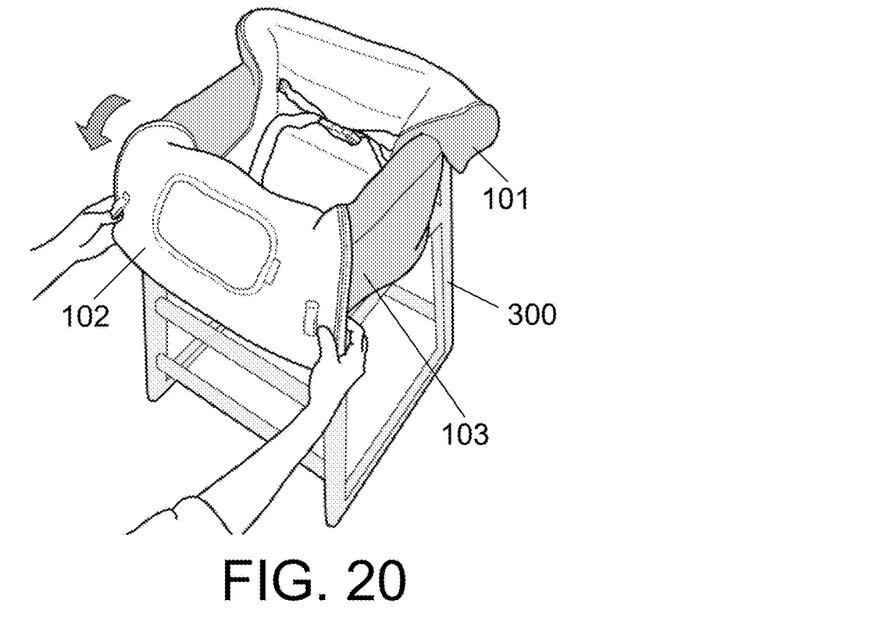
FIG. 20 illustrates a perspective view of a step in the placement of a seat cover on a high chair, according to an exemplary embodiment of the present subject disclosure.

FIGS. 17-20 illustrate the use of cover 100 on a toddler's high chair 300, which may be a type used at home or in a restaurant or other public location. For sake of brevity, the details of the cover 100 will not be presented, but will be the same as that described in FIGS. 1-16. In the present embodiment, the strap 110 of the cover 100 is pulled down underneath the lower edge of the backrest 301 of high chair 300, as shown in FIG. 17. Then, as shown in FIG. 18, the hood 101 is unrolled and flipped over the backrest 301, further exposing the hook 112. FIG. 19 illustrates the step of pulling the strap 110 up and securing an aperture 111 of it to the hook 112 on the hood 101. The fit around the backrest 301 should be snug to ensure that the cover 100 does not move or shift while the toddler is positioned therein. As illustrated in FIG. 20, the front portion 102 of the cover 100 is then unrolled over the front of the high chair 300 and the sides are draped over the sides or handles of the high chair.

Once the cover 100 is securely fastened onto the high chair 300, the toddler may be placed therein, as shown previously in FIG. 12. The toddler's legs will be pulled through the leg holes 107 and the toddler's bottom should be securely seated into the seat portion of the cover 100. The belt 115 is then drawn around the midsection of the toddler and secured using fastener lock 116. To tighten the seat belt 115, a seat belt adjusting lock (not shown) may be used to adjust the size of the seat belt. The parent or caretaker can now proceed with having a meal or other activity while the toddler is secured in the high chair 300. Optional toys, keys, or other distraction devices may be secured onto the hooks 106 and/or an electronic device, such as a smart phone, may be secured into pocket 105 to provide entertainment for the toddler.

The subsequent folding of the cover 100 after use on the high chair is substantially the same as that described in FIGS. 13-16, but as applied to a high chair 300. The folding process is essentially the reverse of the process illustrated in FIGS. 17-20.

The cover 100 may be used to prevent the toddler from making contact with any shopping cart, high chair, stroller, or other seating apparatus which may harm the child or expose the child to germs or other contaminants. Such seating apparatus may be outside the home, or inside the home. The versatile nature of the cover 100, as well as its low profile and light weight and durability makes it ideal to be a part of the routine travel apparatus for a parent wherever the toddler is taken.

In one exemplary embodiment, the mid portion of the cover can be a soft material with stuffing. The outer material can be stretchable material to allow the rolling and unrolling and covering of the backrests of the shopping cart and high chairs. Further, the material may be designed to be flexible so that it can have a snug fit on smaller seating apparatus while being able to expand to larger seating apparatus. Further, the cover 100 is designed of any combination of fabric and/or soft and/or hard plastic which is hypoallergenic, machine washable, and durable to withstand daily use.

The illustrations and examples provided herein are for explanatory purposes and are not intended to limit the scope of the appended claims. It will be recognized by those skilled in the art that changes or modifications may be made to the above described embodiment without departing from the broad inventive concepts of the subject disclosure. It is understood therefore that the subject disclosure is not limited to the particular embodiment which is described, but is intended to cover all modifications and changes within the scope and spirit of the subject disclosure.

What is claimed is:

1. A seat cover comprising:
   a reversible pouch-shaped hood having a first pouch configuration and a second pouch configuration that is the reverse of the first pouch configuration, the first pouch configuration being adapted to fit onto a backrest of a seat;
   a front portion adapted to extend over an edge;
   side portions extending an entire length of the hood from a back edge of the hood to a front edge of the front portion of the hood, the side portions adapted to extend over side edges of the seat, wherein the front portion and the side portions together form a hood-shaped configuration; and
   a securing device attached to the hood, the securing device adapted to attach the hood to the seat;
   wherein the cover is rollable into the second pouch configuration of the hood and is maintained in its rolled position by the securing device.

2. The seat cover of claim 1, further comprising apertures positioned at the front portion and adapted to accommodate legs of a toddler.

3. The seat cover of claim 2, further comprising movable covers for the apertures.

4. The seat cover of claim 1, further comprising hooks positioned on the front portion.

5. The seat cover of claim 1, further comprising a pocket positioned on the from portion.

6. The seat cover of claim 5, wherein the pocket s transparent.

7. The seat cover of claim 1, further comprising a seat belt positioned in between the hood and front portion.

8. The seat cover of claim 1, wherein the hood comprises an external surface of the completely rolled cover.

9. The seat cover of claim 1, wherein the hood, the front portion, and the side portions are all adapted to substantially cover corresponding portions of the seat on at least three sides.

10. The seat cover of claim 1, wherein the hood, the front portion, and the side portions are all adapted to cover all upper and side portions of structures positioned directly underneath them.

11. The seat cover of claim 1, further comprising a cushion positioned in between the hood and the front portion.

12. The seat cover of claim 1, wherein the cover is comprised of a stretchable fabric.

13. The seat cover of claim 1, wherein the securing device comprises a strap and a hook.

14. The seat cover of claim 13, wherein the strap becomes a carry handle when the cover is completely rolled.

15. The seat cover of claim 13, wherein the strap and hook are connectable with each other both when the cover is completely open and covering the seat, and when the cover is completely rolled up.

16. A low profile, rollable seat cover for a shopping cart, comprising:
   a reversible pouch-shaped hood where in a first pouch position is adapted to fit onto a backrest of a seat;
   a front portion attached to the reversible hood and adapted to extend over a handle; and
   side portions extending an entire length of the hood from a back edge of the hood to a front edge of the front portion of the hood, the side portions adapted to extend over side edges of the seat, wherein the front portion and the side portions together form a hood-shaped configuration;
   wherein the cover is completely rollable and is maintained in its rolled position by the reversible hood in a second pouch position which is the reverse of the first pouch position.

17. The seat cover of claim 16, further comprising a securing device attached to the hood, the securing device adapted to attach the hood to the seat.

18. A method of placing a cover over a seat comprising:
   providing a cover having a hood, a front portion of the hood, and side portions extending an entire length of the hood from a back edge of the hood to a front edge of the front portion of the hood, wherein the front portion and the side portions together form a hood-shaped configuration, such that the hood has a first pouch configuration and a second pouch configuration that is the reverse of the first pouch configuration;
   placing the hood in its first pouch position over a backrest of the seat;
   securing the hood to the backrest of the seat;
   unfolding the cover completely;
   extending the hood-like side portions over side edges of the seat;
   extending the front portion over a front portion of the seat; and
   expanding the side portions over side portions of the seat.

19. The method of claim 18, wherein the securing step includes connecting a strap to a hook.

* * * * *